(12) United States Patent
Wendling

(10) Patent No.: US 9,154,297 B2
(45) Date of Patent: Oct. 6, 2015

(54) METHOD FOR GRANTING A PLURALITY OF ELECTRONIC COMMUNICATION DEVICES ACCESS TO A LOCAL AREA NETWORK

(71) Applicant: NAGRAVISION S.A., Cheseaux-sur-Lausanne (CH)

(72) Inventor: Bertrand Wendling, Divonne-les-Bains (FR)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

(21) Appl. No.: 14/108,813

(22) Filed: Dec. 17, 2013

(65) Prior Publication Data

US 2014/0169567 A1    Jun. 19, 2014

Related U.S. Application Data

(63) Continuation-in-part of application No. 13/717,840, filed on Dec. 18, 2012.

(30) Foreign Application Priority Data

Dec. 18, 2012    (EP) .................................... 12197757

(51) Int. Cl.
    *H04L 29/06* (2006.01)
    *H04L 9/08* (2006.01)
    *H04W 12/04* (2009.01)

(52) U.S. Cl.
    CPC ............ *H04L 9/0819* (2013.01); *H04L 9/0863* (2013.01); *H04L 9/0866* (2013.01); *H04W 12/04* (2013.01)

(58) Field of Classification Search
    CPC .... H04L 9/0819; H04L 9/0866; H04W 12/04
    See application file for complete search history.

(56) References Cited

U.S. PATENT DOCUMENTS

| 2001/0008015 A1 | 7/2001 | Vu et al. |
| 2003/0097336 A1* | 5/2003 | Cordery .......................... 705/60 |

(Continued)

FOREIGN PATENT DOCUMENTS

| EP | 1 499 067 | 1/2005 |
| EP | 1 701 478 | 9/2006 |

(Continued)

OTHER PUBLICATIONS

European Search Report issued in EP 12 19 7757, dated May 10, 2013.

(Continued)

*Primary Examiner* — Justin T Darrow
(74) *Attorney, Agent, or Firm* — DLA Piper LLP US

(57) ABSTRACT

Method for granting a plurality of electronic communication devices access to a local area network (LAN) via an access point using a single cryptographic key to secure communications exchanged through the LAN. The method comprising an activation phase performed once at initialization of the LAN and an operating phase wherein the electronic communication devices accesses the LAN. The activation phase comprising: providing the cryptographic key in a digital form by the access point; transferring the cryptographic key to a master device, switching the access point into a secure mode in which any further communication with the access point is secured with the cryptographic key. The operating phase comprising: transferring the cryptographic key from the master device to the electronic communication devices. The cryptographic key is converted from its digital form into a graphic form and then transferred in the graphic form to the electronic communication devices during the operating phase.

13 Claims, 1 Drawing Sheet

(56) References Cited

U.S. PATENT DOCUMENTS

| | | |
|---|---|---|
| 2004/0124246 A1 | 7/2004 | Allen et al. |
| 2005/0272371 A1 | 12/2005 | Komatsuzaki et al. |
| 2008/0008125 A1 | 1/2008 | Pham et al. |
| 2009/0164644 A1 | 6/2009 | Soderberg et al. |
| 2012/0045059 A1* | 2/2012 | Fujinami ................. 380/273 |
| 2012/0171991 A1 | 7/2012 | Pham et al. |
| 2014/0056171 A1 | 2/2014 | Clegg |

FOREIGN PATENT DOCUMENTS

| | | | |
|---|---|---|---|
| WO | WO 98/50842 | 11/1998 | |
| WO | WO 2007/095375 | 8/2007 | |
| WO | WO 2010131415 A1 * | 11/2010 | ............... H04L 9/08 |

OTHER PUBLICATIONS

Image File Wrapper of U.S. Appl. No. 13/717,840.

* cited by examiner

METHOD FOR GRANTING A PLURALITY OF ELECTRONIC COMMUNICATION DEVICES ACCESS TO A LOCAL AREA NETWORK

CROSS-REFERENCE TO RELATED APPLICATIONS

This application claims priority to European patent Application No. EP 12197757.3, filed Dec. 18, 2012 and is a Continuation-in-Part of U.S. patent application Ser. No. 13/717,840, filed Dec. 18, 2012. Both of the foregoing applications are incorporated by reference in their entireties.

TECHNICAL FIELD

The present invention relates to the field of local area networks, in particular it suggests a method to grant electronic communication devices access to a home network.

BACKGROUND ART

Thanks to the expansion of portable communication device such as tablet computers, laptops and smart phones, today a lot of people have access to Internet via a wireless connection, in particular via a local area network implemented within a home or a business environment. The wireless access to a local area network makes it necessary to develop a security policy regarding business places and home places. If the access to the wireless point is not secure enough, it could result a problem regarding the legal responsibility of the access point owner when a third party performs illegal actions on a network, such as the Internet, through such an access point. Illegal actions can refer, e.g., to downloading or disseminating unauthorized copies of works protected by copyright, such as music, photo and videos.

The access to a local area network is protected by a transmission key which encrypts the data transmitted within this network, for instance between a personal computer and an access point such as a router. Physically, the router defines the juncture between the local area network (LAN) or a wireless local area network (WLAN) and the World Wide Web (Internet) or any other second network. If the transmission key is shared with another communication device (e.g. a host computer) within the range of the signal emitted by the router, then this communication device will have access to Internet through the LAN. Thus, granting the access to a LAN/WLAN depends on the transmission key. To provide an efficient protection against malicious persons, this transmission key must comprises a large number of various characters (prints) forming a string which is not easy to deduce. However, and particularly within a home environment, such a string is generally a short alphanumeric string, since securing the access to the network with a strong transmission key is cumbersome, in particular each time this key must be entered in a host device of a visitor. On the other hand, an efficient and strong key is generally much more difficult to remember. Consequently, the user frequently writes the transmission key in a handwritten notebook. However, these solutions do not meet the initial security goals sought by the transmission key which becomes immediately readable to any person having access to such a notebook.

Besides, entering a transmission key into a host computer is generally made in the presence of the owner of the host electronic device. Accordingly, there is still a risk that this person is able to remember the key which could then be transmitted to other person without any control from the proprietor of the LAN.

Therefore, there is a need for improving the management of transmission keys required for granting access to a network, in particular to a LAN within a home or business environment.

SUMMARY

At least part of the above-mentioned problems may be solved by granting a plurality of electronic communication devices (such as portable devices connectable to Internet) access to a local area network via an access point using a single cryptographic key to secure communications exchanged through this local area network. A method according to one embodiment comprises an activation phase performed once during an initialization of the local area network and an operating phase during which these electronic communication devices get access to the local area network for exchanging data with any device of this network.

The activation phase of this method comprises the steps of:
providing, by the access point, the cryptographic key in a digital clear form,
transferring the cryptographic key to a master device, then switching the access point into a secure mode in which any further communication with this access point is secured with the cryptographic key.

The operating phase of this method comprises the step of:
transferring the cryptographic key from the master device to any of the electronic communication devices wanting to have access to the local area network.

According to the invention, the cryptographic key is converted from its digital form into a graphic form, and then this cryptographic key is transferred, in this graphic form, to the electronic communication devices during the operating phase.

Preferably, the master device is a portable electronic communication device such as a tablet computer, a smartphone or any other device having a processor, a memory, a wireless transceiver and means (such as a display screen) for displaying pictures and communication abilities to get data from the access point. The master device could be also one of the aforementioned electronic communication devices connectable to the LAN. Still preferably, such a device is provided with a display screen and could be connected to a printer, so that it is able to render the graphic form of the cryptographic key on its display and/or on a paper printed by the printer.

According to another embodiment, the cryptographic key could be transferred in a graphic form that is in accordance to a picture file format. The transmission of the cryptographic key in such a form and in accordance with such a format can be carried out during the activation phase (between the access point and the master device) and/or during the operating phase (between the master device and the electronic communication devices, even between the access point and any of said electronic communication devices).

According to the invention, the cryptographic key is converted into a form which is advantageously unintelligible for any person, while remaining unencrypted. Indeed, the cryptographic key is provided in a hidden form, so that any person seeing this key in its graphic form will be unable to memorize it. Generally speaking, such a person would unable to do anything without an appropriate tool, in particular without an application or software allowing one to read the graphic form of the cryptographic key. Moreover, owing to its graphic form, the cryptographic key does not require previous exchanges of specific key or shared data to decrypt the cryptographic key, given that it is not provided in a common encrypted form. While representing this key in an unintelligible form for the human, the graphical code of this key enables easily sharing it with a lot of electronic communication devices without requiring cryptographic operations to extract usable data for such devices.

Other advantages and embodiments will be presented in the following detailed description.

BRIEF DESCRIPTION OF THE DRAWINGS

The present invention will be better understood thanks to the attached figures in which.

DETAILED DESCRIPTION

Figure 1:
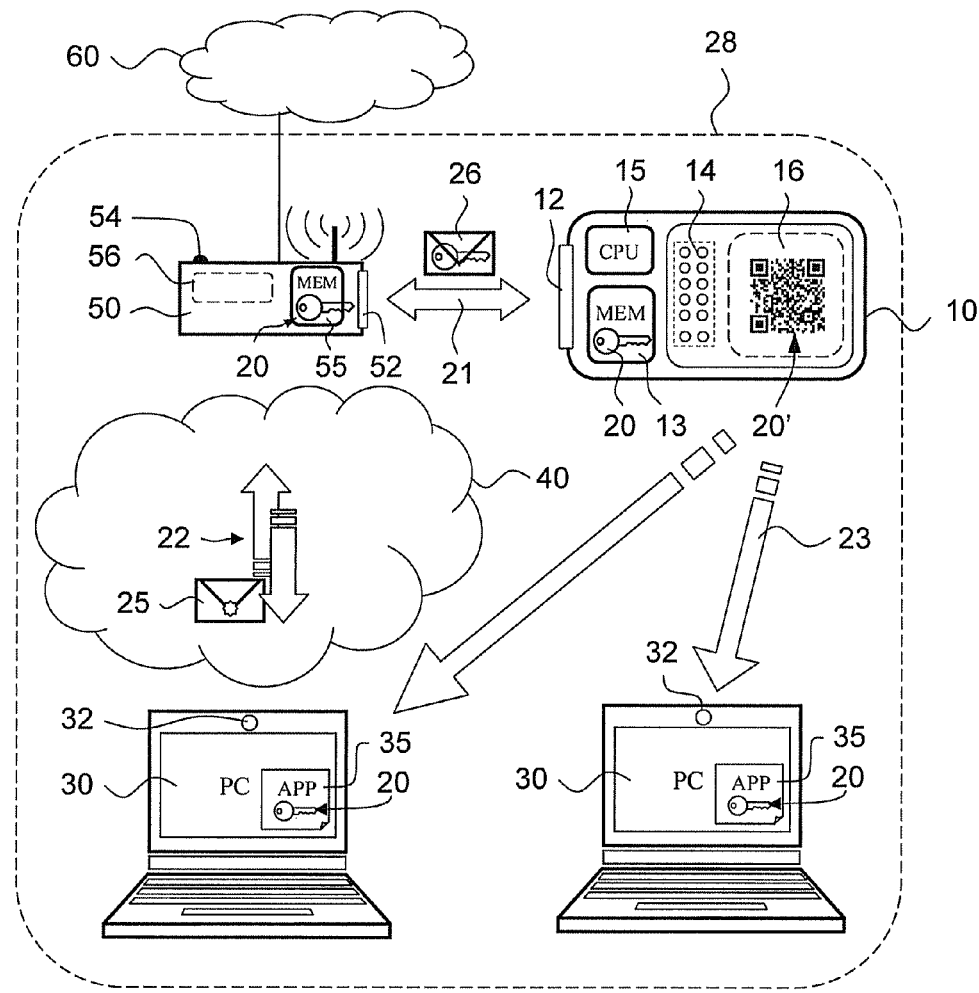
FIG. 1 is a block diagram depicting an overview of the main devices involved in the method of the present invention, FIG. 2 provides examples of graphical codes which can be used for representing the cryptographic key in the method of the present invention.

Referring to FIG. 1, the latter is an overview of the system relating to the method of the present invention. This system comprises a plurality of electronic communication devices 30 such as a personal computer, a tablet computer, a laptop, a smart phone or any other device (e.g. printer, internet radio, etc.). Each of these devices is connectable to a local area network (LAN) 40, in particular a wireless local area network (WLAN) controlled by an access point 50 such as a router. This router represents the border between the WLAN and a second network 60, for instance a public network such as Internet to which this router is therefore also connected. In case where the local area network (LAN) is a wireless local area network (WLAN), each electronic communication device 30 is connectable to the access point via a wireless link 22, typically a radio signal emitted by the access point 50. The radio range of the access point 50 defines the local environment 28 (e.g. a home or a business area network) within which encrypted data 25 can be securely exchanged, between the access point and any authorized device 30 or between two or more authorized devices 30 via the access point 50. Of course, in variant the link 22 could be also a wired link.

To secure the communications within the WLAN and thus to prevent third persons to have access to any of said networks 40, 60, data 25 exchanged through the network 40 is encrypted by a secure key, also known as transmission key KT or preferably as cryptographic key 20. Such a secure data exchange is represented in the FIG. 1 by the sealed envelope sent through the network 40 by means of the two-way secure link 22, which is preferably a wireless link. According to the present invention the cryptographic key 20 is a single key used by any device 30 connected to the local area network 40. Advantageously, cryptographic operations based on a single key are easily handled by any device 30 connected to the local area network 40. In addition, such devices 30 are immediately ready to securely exchange data with any other device 30 of the same local area network 40. Therefore, the implementation of a network is facilitated by the use of a single key.

Accordingly, any electronic communication device 30 wanting to have access to the second network 60 via the access point 50 must have access to the first network 40. Access to the WLAN 40 is granted by obtaining the adequate cryptographic key 20 required for encrypting and decrypting any data passing through the secure network 40. In particular the cryptography key 20 is transmitted to application software 35 installed in the devices 30, which is at least in charge of cryptographic operations for encrypting/decrypting said data.

To this end, the present invention suggests a method for granting a plurality of electronic communication devices 30 access to the local area network 40 via the access point 50 which uses the single cryptographic key 20 to secure communications exchanges through this network 40. This method comprises two phases. The first phase is a so-called activation phase performed once during an initialization of the network 40. The second phase takes place after this network has been initialized by the activation phase. During the so-called operating phase, the electronic communication devices 30 get access to the local area network 40. After the second phase, each device 30 having a granted access to the LAN 40 is allowed to get or to exchange data, via the access point 50, with any other device (including the access point itself).

The activation phase comprises several steps. The first step aims to provide a cryptographic key 20 by the access point 50. This key 20 is provided in a digital clear form, usually represented by an alphanumeric string which is fully readable and duplicable by any person. It should be understood that the clear form of this key means that the key remains in an unencrypted form. The access point can provide such a cryptographic key 20 by using a key generator, preferably located within this access point. For instance, this key generator is able to generate, in plain form, a digital cryptographic key 20 each time a specific button 54 is pressed. Preferably, a long pressure on the specific button 54 of the access point could generate a new cryptographic key (i.e. different from the previous one), whereas a short pressure on this button 54 could resend the same unencrypted key (as that previously generated). Still preferably, the cryptographic key results from a random or a pseudo-random process performed by the key generator.

In a variant, the provision of the cryptographic key 20 by the access point 50 can be performed by retrieving this cryptographic key from a memory 55 (e.g. a secure memory) located within the access point. This memory 55 can store one or several cryptographic keys 20 in a digital clear form. For instance, the cryptographic key can be taken from of set of preloaded keys, either in a certain order or in a random manner. The memory 55 could be also reloaded with other keys or other sets of keys, for instance during an updating process of the access point 50 or a reloading process of its memory 55. Besides, the access point 50 could be also provided with its own display means 56 for displaying any kinds of information about its state or about the content of its memory 55.

During the next step of the activation phase, the cryptographic key 20 is transferred from the access point 50 to a master device 10. Such a master device can refer to several kinds of electronic devices. Preferably, the master device 10 is a portable electronic device such as a smartphone or a tablet computer. As shown in FIG. 1, the master device is provided with a display means 16 and a communication interface 12 for receiving the cryptographic key 20 from the access point 50, in particular through its communication interface 52. The master device 10 further comprises a memory 13 for temporarily or permanently storing the cryptographic key 20 as received from the access point 50. The master device 10 can further comprise a user interface 14 allowing e.g. to enter a PIN code used as required data for granting the user access to the master device 10, so that the access to this device 10 is protected by the PIN code. The management of the components and functions of the master device 10 is directed by a central processing unit (CPU) 15. Besides, given that such a master device can be mainly used to get the cryptographic key 20 before dispatching it to electronic communication devices 30, such a device could be also defined as being a key carrier.

According to another embodiment, the master device 10 could also be one of the electronic communication devices 30, since the master device 10 could be also used as a common device that has access to the local area network 40. In such an embodiment, one of the electronic communication devices 30 is therefore identified as being the master device 10 for the sole reason that this device plays a specific role during the activation phase. Accordingly, the master device 10 does not necessarily differ from the electronic communication devices 30, since afterwards it can have the same role as the other devices 30.

According to the illustration provided by FIG. 1, the cryptographic key 20 is transferred in an unencrypted message 26 from the communication interface 52 belonging to the access point 50 to the communication interface 12 of the master device 10 through a first link 21 connecting these two interfaces. Preferably, these communication interfaces 12, 52 are short range communication interfaces and still preferably are NFC compliant. Accordingly, the first link 21 is a wireless unsecured short range link which is used during the activation phase only for transferring the cryptographic key 20 from the access point 50 to the master device 10. Alternatively, the first link 21 could be a wired link, typically a USB communication link.

Then, the last step of the activation phase aims to switch the access point 55 into a secure mode in which any further communication with this access point 50 is secured with the cryptographic key 20. Preferably, switching the access point in its secure mode can be carried out as soon as the cryptographic key 20 has been transferred into the master device 10. According to another embodiment, such a switching operation can be performed after having received an acknowledgment message from the master device 10 as response further to the reception of the cryptographic key 20. Alternatively, the access point could be switched into its secure mode after a certain time has been elapsed from sending the message 26.

Once the access point has been switched into its secure mode, the access to the local area network is secured by the cryptographic key 20 for the following reasons. Any data exchanged within the local area network 40 transits through the access point 50. Further to the activation of the secure mode, the access point will always perform a cryptographic operation onto said data by using a predefined cryptographic algorithm which requires the cryptographic key 20. Accordingly, the access to the local area network 40 will not be denied to an unauthorized device that does not have the appropriate cryptographic key 20, but data exchanged with this unauthorized device will remain incomprehensible for the other devices of this network. Therefore, such an unauthorized device will unable to exchange data with other devices 30 and more generally it will unable to download/upload correct data via the access point. For this reason, one can say that the security of the local area network has been activated and that the initialization of this network is now ended.

Since the activation phase is ended, the operating phase can be performed by involving any electronic communication device 30 wanting to connect to the local area network 40 in order to get access to this LAN. To this end, the cryptographic key 20 is transferred during this second phase from the master device 10 to each electronic communication device 30 wanting to join the network.

According to the invention, specific operations are undertaken during one or both of the aforementioned phases. These specific features are described now in the following lines.

The first main features involve the conversion of the cryptographic key 20 from its digital clear form into a graphic form 20' and then the transfer of the cryptographic key 20 in this graphic form 20' to the aforementioned electronic communication devices 30 during the operating phase.

Figure 2:
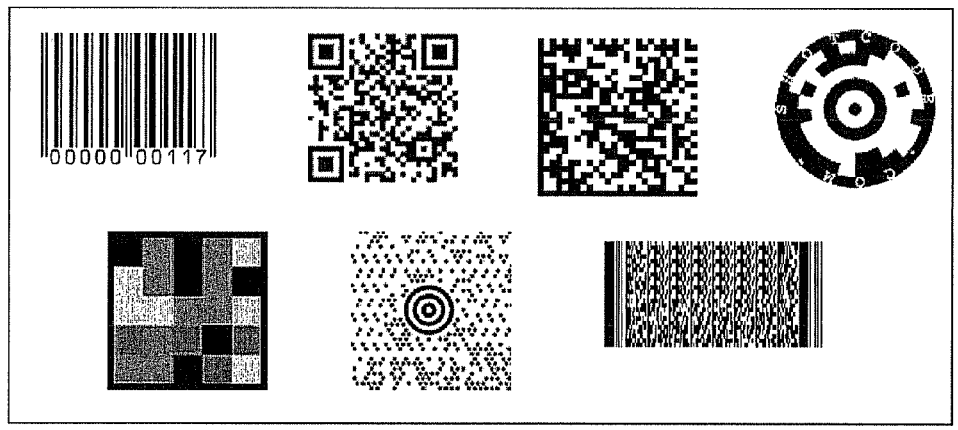

Such a graphic form 20' can correspond to a barcode having one or two dimensions, to a so-called "QR code" referring to "Quick Response Code" or to any other code having a special design which is indecipherable (unreadable) when it is viewed by a person, contrarily to the case where it is scanned by an optical scanning device and becomes readable to such as device. Preferably, the graphic form 20' of the cryptographic key 20 is a two dimensional graphical code and still preferably a black and white bi-dimensional graphical code. As example of graphical codes, FIG. 2 discloses successively a barcode, a QR-code, a Datamatrix, a Shotcode, a colorzip (in black and white), a Maxicode and a PDF417 code. With the exception of the first code (barcode), all of the graphical codes illustrated in this FIG. 2 are two-dimensional graphical codes.

According to one embodiment, the step aiming to convert the cryptographic key 20 into a graphic form 20' is performed in accordance to a picture file format by the access point (50). Then, during the activation phase, the cryptographic key 20 is transferred to the master device 10 in its graphic form 20' and in accordance with the aforementioned picture file format. Such a picture file format can refer to any image file format such as the JPEG standard or any other well known format (TIFF, GIF, BMP, PNG, WEBP, RAW etc.).

Once provided by the access point 50, the cryptographic key 20 can be stored in a memory 55 of this access point in view to be resent, on request, to any device 10, 30 having access to the local area network 40. In this case, the cryptographic key is resent in its graphic form 20' and in accordance to the relevant picture file format. Therefore, the cryptographic key 20 will be preferably stored in its graphic form 20 and in accordance to said picture file format in the memory of the access point 50.

In another embodiment, the cryptographic key 20 can be converted by the master device 10 after being received from the access point in its digital form. Preferably, this conversion is still done during the so-called activation phase, once the cryptographic key 20 has been received from the access point. Similarly, the cryptographic key 20 can be also stored within the master device 10 (e.g. within a secure memory of the master device), in view to be afterwards transferred to any of said electronic communication devices 30 during the operating phase.

Whatever the embodiment, the conversion of the digital cryptographic key 20 into a graphic form 20' (in accordance with any image file format) can be easily performed by software/application installed in the access point 50 or in the master device 10. Such a conversion could be also performed by a specific unit such as the central processing unit CPU 15 within the master device 10. Advantageously, such a software/application does not require any secret shared with other entities in order to carry out such a conversion. On the other hand, such software/application can be easily found and/or updated, for instance through the wide world web (Internet).

According to another main feature of the invention, the cryptographic key 20 is transferred in its graphic form to the electronic communication devices 30 during the operating phase. Such a transfer is schematically represented in FIG. 1 by the arrows 23 which illustrate the dispatching of the cryptographic key 20 in its graphic form 20'.

According to one embodiment, a reproduction (i.e. a duplication) of the graphic form 20' of the cryptographic key 20 is generated by the master device 10, namely by the first device of the network 40 which has received the cryptographic key via an unencrypted message 26 from the access point 50. Then, this reproduction is successively presented to each of the electronic communication devices 30 wanting to join the local area network 40, so that each of these devices 30 can read the reproduction through an optical reader 32. Such an optical reader 32 can be e.g. a scanner, a webcam or a built in camera of the device 30. An optical link can therefore be established between the master device 10 and the device 30 to allow the latter to get the cryptographic key in its graphic form 20'. Given that the graphic form is optically read by the electronic communication devices 30, one can say that the cryptographic key is optically transferred to these electronic communication devices 30. However, it should be noted that such an optical transfer has nothing to do with a transfer of data through optical fibers.

This reproduction can be obtained by several manners. For instance and as shown in FIG. 1, the graphic form 20' can be displayed on the display means 16 of the master device 10 which could be a portable device. Then the display means 16 of this device can be placed in front of the optical reader 32 of the electronic communication devices 30. Consequently, each device 30 is therefore able to read, to scan or to take a picture of the graphic form 20' reproduced by the maser device 10. Finally, by means of software 35 or by means of a dedicated software, the cryptographic key 20 is retrieved from the graphic form 20' via a reverse process to that which was previously done when the cryptographic key 20 was converted into its graphic form 20'.

In variant, the aforementioned reproduction can be obtained by printing the graphic form 20' received by the master device 10, e.g. by means of a printer connectable to the master device 10. Advantageously, once printed on a sheet, the graphic form 20' can be easily presented, at any time, to any new device 30 wanting to join the network 40.

Alternatively, the graphic form 20' of the cryptographic key 20 can be obtained by an electronic communication device 30 via a computer file or computer data comprising the graphic form in a picture file format. Such a file can be easily transmitted, e.g. from the master device 10 to any device 30.

It should be noted that the operating phase can be undertaken at any time when a new electronic communication device 30 needs the cryptographic key 20 to exchange data through the local area network 40. Accordingly, the operating phase can be performed in parallel with the operation of the network 40.

In addition, it should be noted that the master device 10 could be used for handling several cryptographic keys 20, each belonging to a specific network 40. Preferably, these keys 20 will be stored in their graphic form 20'. Accordingly, the memory 13 of the master device could store more than one key 20, in association with an identifier assigned to each of these keys. Such an identifier will be useful by the user of the master device to retrieve the appropriate key of a specific network 40. For instance, such an identifier will correspond to the name of the network, as defined by the user. Typically, the cryptographic key (in particular its graphic form) and its identifier can be stored in a record within the memory of the master device.

Advantageously, the graphic form does not disclose the nature of information comprised therein. Accordingly, this graphic form does not provide any clue showing that this graphic form refers to a cryptographic key contrarily to a possible strange alphanumeric string.

Preferably, the graphical code used as graphic form of the key is a two-dimensional graphical code which comprises more information than a one-dimensional code (e.g. a simple barcode). Consequently, the two-dimensional graphical code can advantageously have a more compact form than a one-dimensional code and therefore can be smaller. In addition, and as shown in FIG. 1, such graphic codes are more convenient than alphanumeric strings for the optical reader 32 due to their compact form which can fill a bigger area within the optical sensor field of the reader 32.

The invention claimed is:

1. A method for granting a plurality of electronic communication devices access to a local area network via an access point using a single cryptographic key to secure communications exchanged through said local area network, said method comprising:
   an activation phase performed once during an initialization of said local area network, said activation phase comprising
      generating said cryptographic key in a digital clear form by said access point;
      transferring said cryptographic key in said digital clear form to a master device; and
      switching the access point into a secure mode as soon as said cryptographic key has been transferred to the master device, said secure mode being a mode in which any further communication with said access point is secured with said cryptographic key; and
   an operating phase during which said electronic communication devices get access to said local area network, said operating phase comprising
      transferring said cryptographic key from said master device to any of said electronic communication devices;
   wherein said cryptographic key is converted from its digital clear form into a graphic form by the master device and said cryptographic key is transferred in said graphic form to said electronic communication devices during the operating phase.

2. The method of claim 1, wherein converting said cryptographic key into said graphic form is performed in accordance with a picture file format by the access point and, during the transferring step of the activation phase, said cryptographic key is transferred to the master device in said graphic form and according to said picture file format.

3. The method of claim 2, wherein said cryptographic key is stored within the access point in its graphic form and in accordance with said picture file format, to any device having access to said local area network.

4. The method of claim 1, wherein said cryptographic key is stored within the master device and is transferred to any of said electronic communication devices during the operating phase.

5. The method of claim 1, wherein during the operating phase, said cryptographic key is optically transferred to said electronic communication devices by generating a reproduction of its graphic form, and by reading said reproduction by said electronic communication devices through an optical reader.

6. The method of claim 5, wherein said reproduction is obtained by displaying said graphic form on a display of said master device.

7. The method of claim 5, wherein said reproduction is obtained by printing said graphic form by means of a printer connectable to said master device.

8. The method of claim 1, wherein said graphic form is a two dimensional graphical code.

9. The method of claim 1, wherein said master device is a portable device.

10. The method of claim 1, wherein said master device is one of said electronic communication devices.

11. The method of claim 1, wherein said access point provides said cryptographic key by means of a key generator located within said access point.

12. The method of claim 1, wherein said access point provides said cryptographic key by retrieving said cryptographic key from a secure memory located within said access point.

13. The method of claim 1, wherein transferring said cryptographic key from said access point to said master device is performed through a wireless short range communication link.

\* \* \* \* \*